Oct. 18, 1949.   J. B. BRENNAN   2,485,355
PROJECTION APPARATUS FOR TOOL SETTING
Filed Aug. 13, 1945
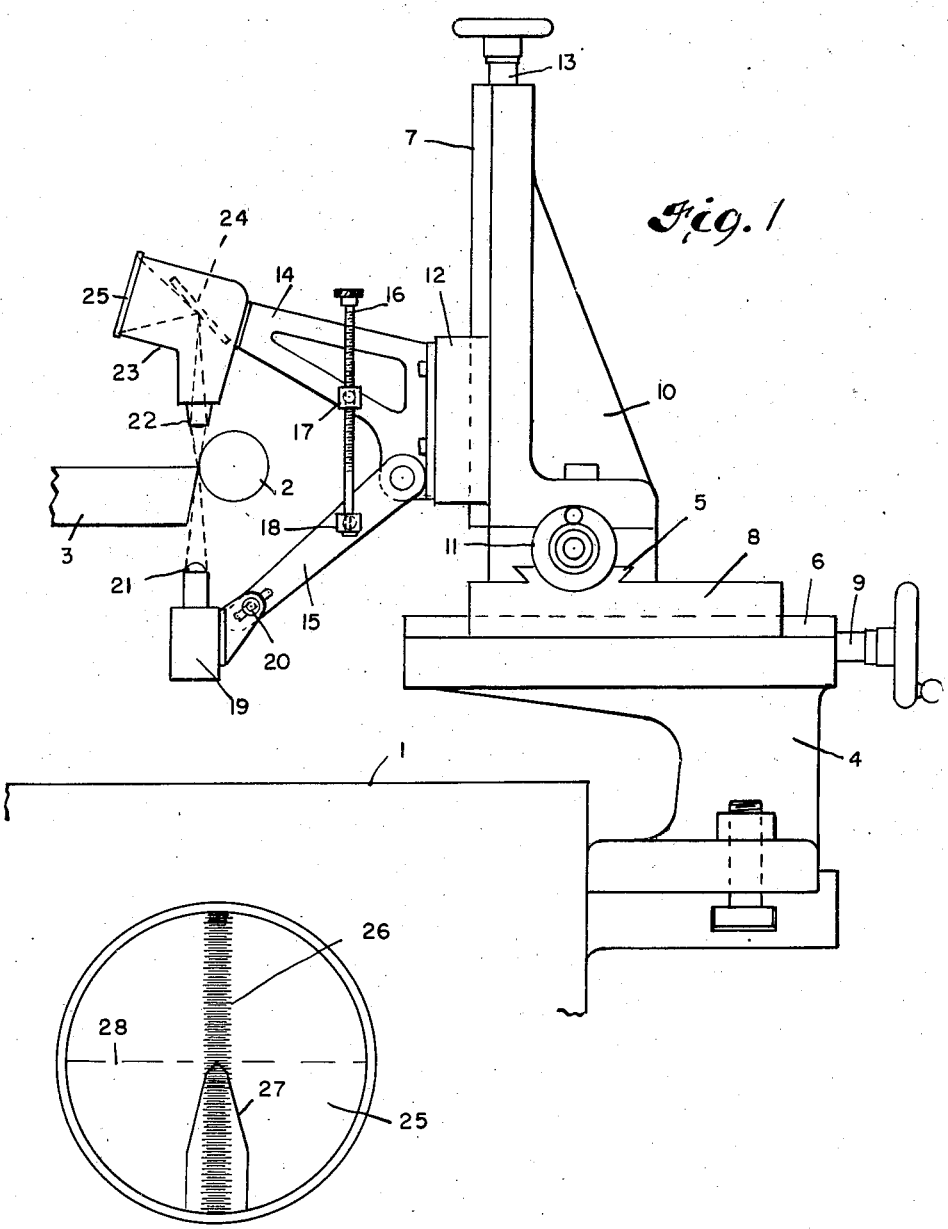
INVENTOR.
JOSEPH B. BRENNAN
BY
Oberlin & Limbach
ATTORNEYS Patented Oct. 18, 1949

2,485,355

UNITED STATES PATENT OFFICE 2,485,355

PROJECTION APPARATUS FOR TOOL SETTING

Joseph B. Brennan, Cleveland, Ohio

Application August 13, 1945, Serial No. 610,589

4 Claims. (Cl. 88—24)

This invention relates as indicated to apparatus for tool setting and is designed particularly for use in conjunction with machines in which a tool element and a work element are mounted for relative movement and during which movement a particular relationship within close tolerances must be maintained between said elements.

Present-day mechanical devices available for this purpose are subject to wear so that the only manner in which a workpiece may be formed by means of a tool presented thereto is by the cut and try method. This is time-consuming and very expensive because the percentage of work spoiled is generally quite high especially in the hands of relatively inexperienced operators.

It is a principal object of my invention to provide an apparatus which thus obviates all of the difficulties of the prior art, and which is foolproof, relatively simple to operate, and not subject to deterioration and consequent inaccuracies as a result of wear.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 1 is a side elevational view of one form of apparatus with which my invention may be employed showing one embodiment of the apparatus comprising my invention in association therewith; and Fig. 2 is a face view of the viewing device which forms one component of the apparatus illustrated in Fig. 1.

The machine illustrated in Fig. 1, in so far as it is not a part of the apparatus comprising my invention, is shown diagrammatically since the general character and construction of machines of this type is well-known to those familiar with the art. In general, such machine consists of a bed plate 1, at the opposite ends of which are positioned a head stock and a tail stock. Neither of these are illustrated since their omission leads to clarity in the drawing.

The machine illustrated is such that there will usually be positioned between such head and tail stock a work-piece generally indicated at 2 which, for purposes of illustration, has been indicated as a cylindrical bar which is to be operated upon by a cutting tool generally indicated at 3 for the purpose of turning down such bar to a diameter within closely held tolerances.

Mounted alongside the bed plate 1 is an auxiliary bed plate 4 on which is formed a horizontally extending rail or guideway generally indicated at 5, a transversely extending rail or guideway generally indicated at 6, and a vertically extending rail or guideway 7. The transversely extending rail 6 is formed on the base 4. The longitudinally extending rail 5 is formed on an auxiliary member 8 movable on the rail 6 and adjustable relatively thereto by means of a screw 9. The vertically extending rail 7 is formed on the member 10 which is movable on the rail 5 by means of the screw 11. A head 12 is movable on the rail 7 by means of a screw 13. Each of these rails or guideways and their associated screws are formed as in conventional machine tool design so that their precise construction, which forms no part of the present invention need not be more particularly illustrated or described.

The head 12 has a bracket 14 secured thereto, the latter carrying an adjustable arm 15 which is adjusted to and maintained in any of a plurality of selected positions angularly related with respect to the bracket 14 by means of a screw 16 threaded through a block 17 and rotatably held at its lower end in a block or bearing 18.

Mounted on the lower end of the arm 15 is a lamp housing 19, such housing being mounted on a pivot 20 which may be locked in any one of a plurality of selected positions angularly with respect to the arm 15. The lamp housing 19 is provided with a lens 21 by which the light from the lamp contained therein is projected into the lens 22 in the viewing device 23 where such light beams are reflected by means of a mirror 24 onto a translucent screen 25 fixed in the face of the viewing device 23 as most clearly illustrated in Fig. 2. Since the type of lamp housing 19 and viewing device 23 here illustrated are well-known in that they have been available for some time for other purposes, it is believed that their detailed construction need not be more particularly illustrated or described.

The lamp housing 19 and the viewing device 23 are so positioned relatively to the tool 3 and the work-piece 2 as to bring the operating edge of the work-piece to about the mid point or center of the screen 25. It will be noted that the illumination of the tool and work-piece by means of the ray projected from the lens 21 of the lamp housing 19 will illuminate the tool and workpiece so as to project a silhouette of the same onto the viewing screen 25.

By means of the adjusting screws 9, 11, and 13, the viewing device 23 and the lamp housing 19 may be adjusted relatively to the axis of the work-piece 2 as determined by the axis of the head and tail stocks of the machine so that for the formation of the required diameter of the work-piece, the tool point should project to a particular place or point on the viewing screen. In order to facilitate the location of the tool point, the viewing screen 25 may be provided with a series of graduations as illustrated at 26 in Fig. 2.

If the work to be operated upon is such as to require a number of similar settings of a tool of a given shape, then it will be found convenient to place on the screen 25 a reference outline generally indicated at 27 to which the silhouette of the tool must conform for the proper setting of the machine. In this way, the position, as well as shape, of the tool may be accurately compared not only during the initial setting of the tool preliminarily to the forming operation, but also the shape of the tool and its location may be continuously observed by the operator and compared with respect to the reference standard so as to insure the maintenance of proper working conditions at all times.

It will be observed that the screen 25 may also have formed thereon a reference line 28 with which the silhouette of a reference edge on the work, or more accurately a silhouette thereof, may be made to coincide and so held during the forming operation.

It will be observed that by the device which I have provided it is always possible to determine the relative positions of the work element and tool element, and that such determination is not dependent upon any element which by wearing, change in size due to change in temperature, or the like, will in any way affect the determinations by which the operator is guided in maintaining the tool and work-piece in proper relationship.

Instead of having the tool directly illuminated as illustrated in the drawing, it is, of course, possible to provide a mirror or set of mirrors arranged in proper relation to the tool or work-piece against which a light beam may be projected in order to provide reflected illumination where space under the tool or work-piece does not permit of placing the lamp housing in position for direct illumination as illustrated.

Irrespective of the means of illumination for the tool which may be employed, i. e. whether it be illuminated directly as shown in Fig. 1 or by means of a reflected beam projected from one or more mirrors, it is also within the contemplation of my invention to arrange a screen alongside the machine and fixed on a permanent support onto which the silhouette of the tool and/or the work-piece may be projected. Such stationary screen may be in addition to or replace the viewing device including the screen 25 which is carried by the cross-head on the machine. The employment of such a fixed screen will be found to be of assistance in establishing and maintaining a standard both as to the position and shape of the tool, in which case the screen would have placed thereon an outline showing the position and shape of the tool for the standard setting.

Other modes of applying the principle of the invention may be employed, change being made as regards the details described, provided the features stated in any of the following claims or the equivalent of such be employed.

I, therefore, particularly point out and distinctly claim as my invention:

1. The combination with a machine of the character in which a workpiece element and a tool element are required to bear a predetermined relation, of a head provided with a bracket, means supporting said head on one side of said elements with the free end of the bracket disposed above said elements, a viewing device on said head carried at the free end of said bracket and including a downwardly facing lens above said elements, a mirror above said lens having its reflecting surface angularly disposed relative to said lens, and a viewing screen angularly disposed relative to said mirror, an arm having one of its ends pivotally connected to said head and the other of its ends disposed below said elements, an illuminating device carried by such other end of said arm and arranged to direct a beam of light toward said lens whereby a silhouette of said elements is projected through said lens and reflected by said mirror onto said screen, said arm being swingable to vary the distance between said lens and said illuminating device, and screw means between said bracket and arm for predeterminedly adjusting the distance between said lens and said illuminating device.

2. The combination with a machine of the character in which a workpiece element and a tool element are required to bear a predetermined relation, of a head provided with a bracket, means supporting said head on one side of said elements with the free end of the bracket disposed above said elements, a viewing device on said head carried at the free end of said bracket and including a downwardly facing lens above said elements, a mirror above said lens having its reflecting surface angularly disposed relative to said lens, and a viewing screen angularly disposed relative to said mirror, an arm having one of its ends connected to said head and the other of its ends disposed below said elements, and an illuminating device carried by such other end of said arm and arranged to direct a beam of light toward said lens whereby a silhouette of said elements is projected through said lens and reflected by said mirror onto said screen, said supporting means comprising a vertical guideway member for said head and cooperating angularly disposed plural horizontal guide and guideway members for said vertical guideway member.

3. The combination with a machine of the character in which a workpiece element and a tool element are required to bear a predetermined relation, of a head provided with a bracket, means supporting said head on one side of said elements with the free end of the bracket disposed above said elements, a viewing device on said head carried at the free end of said bracket and including a downwardly facing lens above said elements, a mirror above said lens having its reflecting surface angularly disposed relative to said lens, and a viewing screen angularly disposed relative to said mirror, an arm having one of its ends connected to said head and the other of its ends disposed below said elements, and an illuminating device carried by such other end of said arm and arranged to direct a beam of light toward said lens whereby a silhouette of said elements is projected through said lens and reflected by said mirror onto said screen, a pivot longitudinally adjustable along said arm and swingably supporting said illuminating device whereby it may be swung to direct a beam of light vertically toward said lens, and means for locking said pivot and illuminating device in adjusted position on said arm.

4. The combination with a machine of the character in which a workpiece element and a tool element are required to bear a predetermined relation, of a head provided with a bracket, means supporting said head on one side of said elements with the free end of the bracket disposed above said elements, a viewing device on said head carried at the free end of said bracket and including a downwardly facing lens above said elements, a mirror above said lens having its reflecting surface angularly disposed relative to said lens, and a viewing screen angularly disposed relative to said mirror, an arm having one of its ends pivotally connected to said head and the other of its ends disposed below said elements, an illuminating device carried by such other end of said arm and arranged to direct a beam of light toward said lens whereby a silhouette of said elements is projected through said lens and reflected by said mirror onto said screen, said arm being swingable to vary the distance between said lens and said illuminating device, and screw means between said bracket and arm for predeterminedly adjusting the distance between said lens and said illuminating device, a pivot longitudinally adjustable along said arm and swingably supporting said illuminating device whereby it may be swung to direct a beam of light vertically toward said lens, and means for locking said pivot and illuminating device in adjusted position on said arm.

JOSEPH B. BRENNAN.

REFERENCES CITED

The following references are of record in the file of this patent:

UNITED STATES PATENTS

| Number | Name | Date |
| --- | --- | --- |
| 2,035,780 | Beardsley et al. | Mar. 31, 1936 |
| 2,130,710 | Alexander | Sept. 20, 1938 |
| 2,164,169 | Wohlfarth | June 27, 1939 |
| 2,179,799 | Phillips | Nov. 14, 1939 |
| 2,192,529 | Thomas et al. | Mar. 5, 1940 |
| 2,197,308 | Kolb et al. | Apr. 16, 1940 |
| 2,360,772 | Hedin | Oct. 17, 1944 |